United States Patent [19]

Johanneck

[11] Patent Number: 4,702,364

[45] Date of Patent: Oct. 27, 1987

[54] SILO CHUTE HOPPER ATTACHMENT

[76] Inventor: Richard G. Johanneck, Rt. 1, Box 13, Litchfield, Minn. 55355

[21] Appl. No.: 861,513

[22] Filed: May 9, 1986

[51] Int. Cl.4 .............................................. B65G 11/20
[52] U.S. Cl. ....................................... 193/22; 52/195; 52/197; 193/14; 193/34; 222/461
[58] Field of Search ...................... 193/2 A, 14, 22, 23, 193/29, 33, 34; 414/313, 318; 222/460, 461, 526; 248/94, 99, 201, 312.1; 52/195, 197

[56] References Cited

U.S. PATENT DOCUMENTS

| | | | |
|---|---|---|---|
| 2,694,515 | 11/1954 | Green | 226/34 |
| 3,061,063 | 10/1962 | Rutten | 193/17 |
| 3,169,620 | 2/1965 | Patz | 193/2 |
| 3,452,957 | 7/1969 | Zuelsdorf | 248/201 X |
| 4,382,498 | 5/1984 | Glendinning | 193/34 |

FOREIGN PATENT DOCUMENTS 375819  7/1907  France ................................ 248/201

Primary Examiner—Jeffrey V. Nase
Attorney, Agent, or Firm—Kinney & Lange

[57] ABSTRACT

A silo chute hopper attachment that fits underneath an existing silo chute having a swivel end, and an upper hopper portion that has flanges slidably mounted onto brackets fixed to the silo wall so that the hopper slides in and out like a drawer underneath the silo chute. It can be easily removed for getting into the silo chute. When removed the bottom outlet opening of the silo chute is completely open.

9 Claims, 5 Drawing Figures

SILO CHUTE HOPPER ATTACHMENT

BACKGROUND OF THE INVENTION

1. Field of the Invention

The present invention relates to hoppers for mounting onto existing silo chutes on upright silos.

2. Description of the Prior Art

U.S. Pat. No. 4,382,498 illustrates a sileage handling system that utilizes a swivel chute having a flange that attaches permanently to the bottom of the existing vertical silo chute with clips and which has one part that swivels to permit directing the sileage into a plurality of different locations. This device requires a multi-part system and requires release of the swivel member from the flange in order to gain access to the silo chute. The flange restricts the normal opening to the silo chute with the flange that is used.

SUMMARY OF THE INVENTION

The present invention relates to a swivel silo hopper that is slidably mounted onto brackets on the outside of a silo wall. The hopper has an upper portion that has lateral flanges formed in it that slide in and out on these horizontal parts of the brackets like a drawer, so that the entire hopper swivel assembly can be completely removed for access to the silo chute. The hopper will be latched in place securely and permanently when desired.

DETAILED DESCRIPTION OF THE PREFERRED EMBODIMENTS

Figure 1:
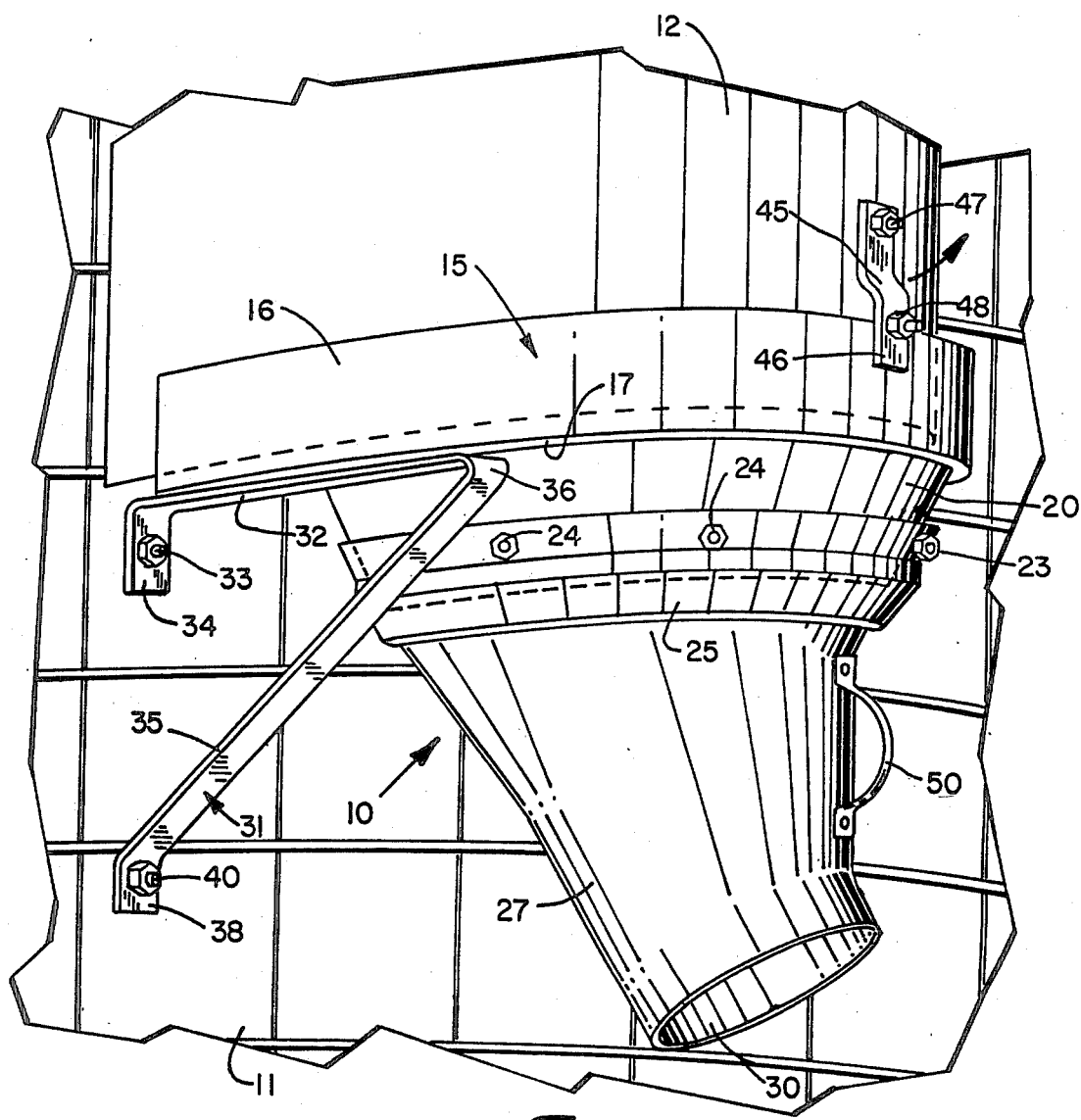
FIG. 1 is a fragmentary perspective view of a portion of a silo having a portion of an existing silo chute shown thereon with a hopper made according to the present invention shown in its operative position.
Figure 2:
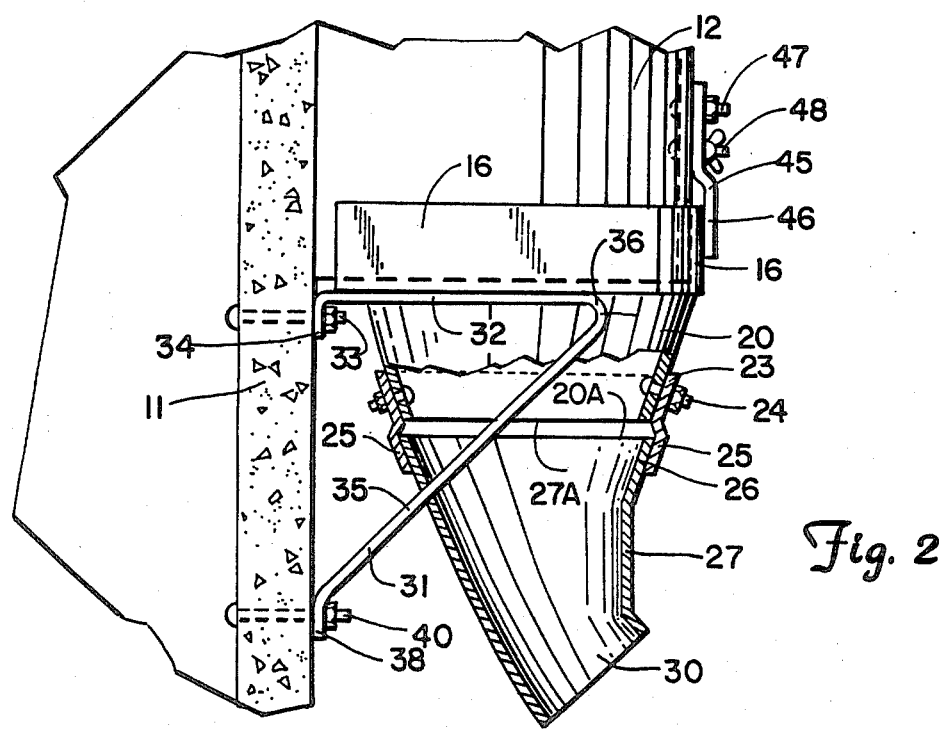
FIG. 2 is a side view of the device of FIG. 1 with parts in section and parts broken away.

Referring to FIG. 1, a silo swivel hopper indicated generally at 10 is shown mounted onto the wall 11 of a conventional upright silo, such as that shown in U.S. Pat. No. 4,382,498 and also a metal upright silo chute indicated at 12 is similar to that shown in the same U.S. patent. These silo chutes are well-known, as are silos, and are used for depositing sileage down through the chute to the lower discharge opening for feeding cattle.

Figure 3:
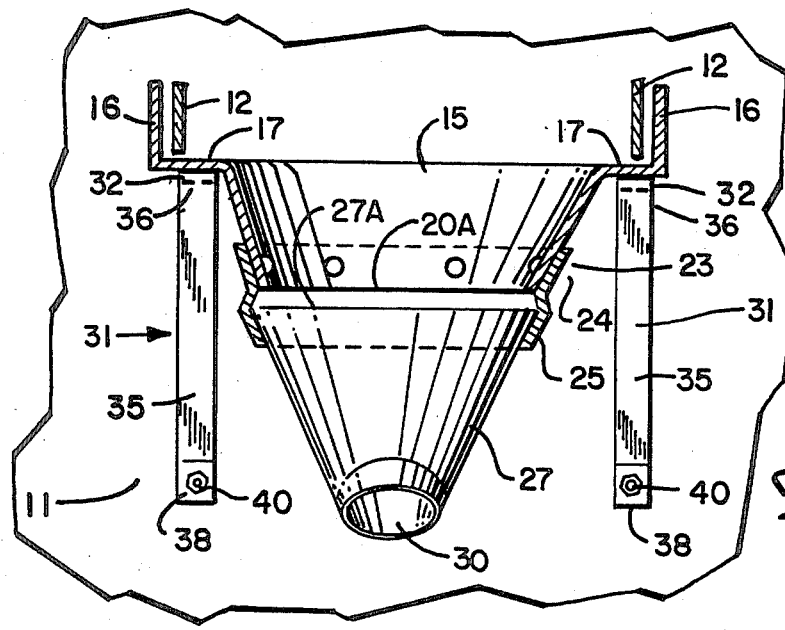
FIG. 3 is a front elevational view the device of FIG. 1 with parts in section and parts broken away.
Figure 4:
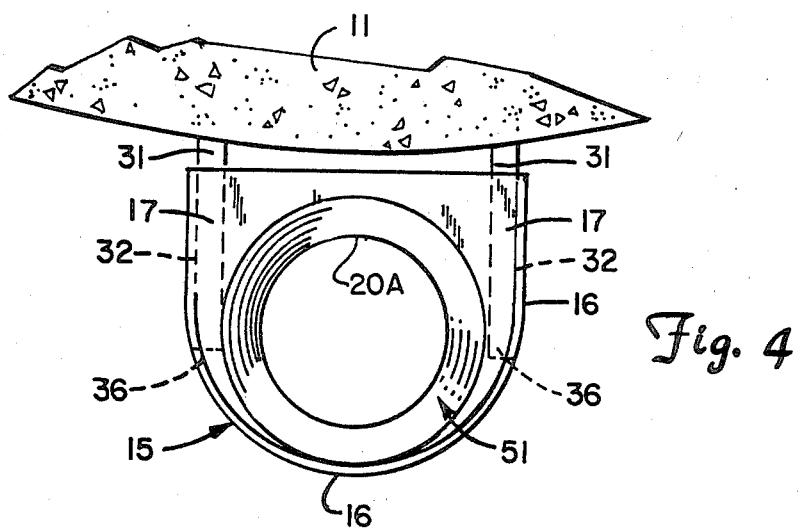
FIG. 4 is a top plan view of the hopper assembly of FIG. 1 with the silo chute removed for sake of clarity.
Figure 5:
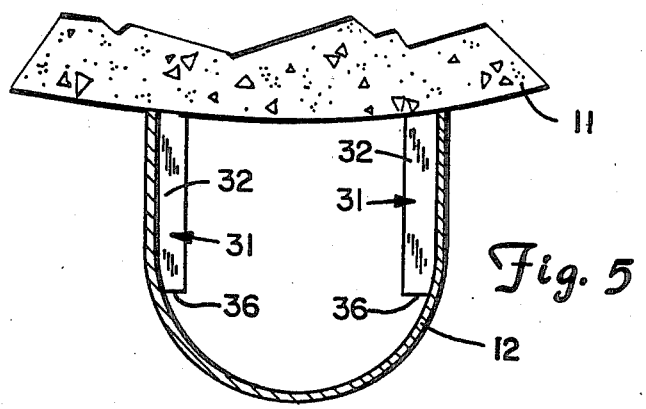
FIG. 5 is a view similar to FIG. 4 showing the silo chute and support brackets in place.

The silo hopper 10 as shown has an upper hopper portion 15, that includes an upright rim 16 that extends around the silo chute and is integral with horizontal flange members 17 (see FIG. 3) along the sides of the hopper, and as shown in FIG. 4 the flange members reduce in width at a front edge of the hopper. A hopper funnel 20 is integrally molded with the side flanges 17 and the rim 16, and merges into a generally cylindrical shape having a circular inlet opening as shown in FIG. 4, and a circular lower opening.

The lower funnel portion of the hopper 20 has a ring 23 bolted to the lower end thereof with suitable bolts 24. The ring 23 completely encircles the hopper funnel 20, and has an offset lower end band 25 that tapers inwardly in a generally conical shape. This offset lower end 25 is of size to receive the upper end of a generally conically shaped portion 26 of a lower swivel member 27 that forms part of the hopper assembly. The offset lower portion 25 of ring 23 tapers inwardly at a sufficient angle so that the swivel member 27 will not drop out, but, since it is conical, will be free to rotate or swivel around the ring 23. The outer opening 30 of the swivel member 27 can be rotated at different angular positions relative to the silo chute and relative to a central upright axis.

A pair of support brackets 31 are used for supporting the under surfaces of flanges 17. The brackets 31 are spaced laterally apart and are positioned under the side walls of the silo chute. The brackets 31 each have a generally horizontal section or strap 32 on ehich the lower surface of the flanges 17 rest, and it can be seen that these horizontal sections 32 are spaced just slightly below the lower edge of the metal silo chute 12 that is a conventional silo chute. They are thus below the discharge opening of the silo chute. This horizontal section 32 is held to the silo wall with a suitable bolt 33 extending through a bent tab 34 formed on the respective horizontal section 32. An angular brace portion 35 of the brackets 31 is bent to extend from the horizontal portion, as at 36, and extends downwardly and toward the silo wall 11 to brace and support the horizontal section 32. A bent tab 38 is used at the lower end of the brace portion 35, and it is fastened to the wall of the silo with a suitable bolt 40.

The brackets 31 are placed on opposite sides of the silo chute 11, as shown in FIG. 3, so that they will support both of the flanges 17 and hold the hopper 10 in position underneath the silo chute 12 to receive sileage discharged. The back edge of the flange at the rear of the hopper, which merges with flanges 17 can be made so that it will fit tightly against the silo wall if desired.

The flanges 17,17 merely slide in on the horizontal sections 32 of brackets 31 like a drawer, and the entire hopper 10 then can be slid out of the way below the lower edge of the silo chute 12.

In order to hold the hopper in place, a releasable latch 45 is provided that has a tang portion 46 that extends in front of the rim 16 at the forward edge, and is mounted on a pivot bolt 47, with a wing nut release bolt 48 that can be released so that the lock member 45 can be swiveled out of the way to clear the front edge of the flange 16 and permit the hopper assembly to be slid in and out quickly. The hopper also can be quickly replaced after it is once removed. A suitabel handle 50 can be provided to the front edge of the swivel portion 27 of the hopper for permitting the hopper to be pulled in and out.

The entire upper hopper 15 including the lower hopper funnel 20, the flanges 17 and the rims 16 can be molded, as can the ring 23, from suitable plastic. The swivel portion 26 also can be molded, and it should be noted that the lower edge 20A of the lower hopper portion 20 terminates above the upper edge 27A of the swivel member 27, so that there is clearance and no interference and the lower swivel member can swivel as desired. The bolts holding the ring 23 in place permanently hold it in position, and there is no need for disassembling the swivel from the upper hopper portion 15 to gain access to the silo chute.

The brackets 31 are bent from steel straps, and formed in a unitary piece, or they can be other types of brackets that have a generally horizontal upper member such as that shown at 32 providing a horizontal surface for supporting the under surface of the flanges 17.

Again, the horizontal members 32 are positioned immediately below the silo chute, and near the outer lateral walls where they attach to the silo wall 11. This spacing provides for an adequate opening to the hopper portion, so that sileage can be discharged without plugging or having problems with hanging up. The hopper funnel 20 fits between brackets 31.

In FIG. 3 the sectional view is taken near the wall 11, at the maximum width of the flanges 17 for illustrative purposes.

Other types of catches and locks to hold the hopper in place can be used, and, once released, the hopper can easily be slid out of its working position for access to the silo.

The opening shown at 51 in FIG. 4 leading to the hopper can be generally circular, or can be shaped as desired.

The lower edge 20A is also shown in FIG. 4, and is generally circular so that the portions of the hopper on which the ring 23 mount is generally conical.

The hopper can be made out of any desired material, and does not have to have a swivel, or can have different types of hangers or swivel members in place of the ring 23.

The lower portion 25 of ring 23 has to be of sufficient length and taper angle to be able to overlap and support the swiveling member 26, and other than that the unit can slid in and out easily on its horizontal surfaces for quick removal if access to the silo chute is desired.

What is claimed is:

1. A hopper arrangement for a silo having an upright silo chute with a bottom edge, and a discharge opening including:
    a pair of brackets adapted to be mounted onto a silo and laterally spaced apart below the bottom edge of the silo chute, said brackets having laterally extending support portions immediately below the silo chute; and
    a silo hopper having laterally extending flange means on opposite sides thereof for being supported on said support portions of the brackets immediately below a silo chute, said hopper having a hopper opening and a hopper outlet through which sileage can be discharged and said support portions and flange means cooperating for permitting substantially horizontal slidable movement of the silo hopper to a position to uncover the discharge opening of the silo chute.

2. The apparatus as specified in claim 1 wherein said hopper comprises an upper hopper portion, and a lower swivel member operable to move the outlet into a plurality of different angular positions with respect to an upright axis.

3. The apparatus as specified in claim 2 wherein said upper hopper portion comprises a member having an outer support ring thereon, said outer support ring having an inwardly tapering portion tapering toward a central axis and having an inner surface, and the swivel member being supported on said inwardly tapering portion, said swivel member having a mating surface engaging the inner surface of said inwardly tapering portion and being rotatable on said inner surface.

4. The apparatus as specified in claim 1 and latch means for holdng said hopper in position on said support portions of said brackets.

5. A kit for attachment to a silo having an upright silo chute with a lower edge, said silo chute being adapted to carry sileage therethrough under gravity, said kit comprising:
    a pair of brackets adapted to be mounted onto a wall of a silo in position below the silo chute and spaced apart;
    said brackets each having an upper generally horizontal surface, and braces from outer ends thereof back toward the wall of the silo; and
    a hopper member having lateral side flanges thereon adapted to slide on the upper horizontal portions of the bracket and to be positioned between the brackets and below the silo chute to receive sileage therefrom and to be substantially horizontally slidably removable from the brackets to uncover the lower end of the silo chute.

6. The apparatus as specified in claim 5 wherein said hopper member has a lower swivel portion that can be swiveled relative to said flanges.

7. The apparatus as specified in claim 6 wherein said hopper includes a rim that is upstanding and is positioned around the outer periphery of the lower edge of a silo chute when in position on the silo.

8. The kit of claim 5 further comprising a hopper member that has an upper portion, and a lower swivel, said lower swivel being mounted for swiveling movement on said upper portion, so that the lower swivel member can be oriented at different angular positions with respect to an upright axis.

9. A hopper arrangement for a silo having an upright silo chute with a bottom edge, and a bottom discharge opening including:
    bracket means adapted to be mounted onto a silo and laterally spaced apart below the bottom edge of the silo chute, said bracket means having support portions immediately below the silo chute;
    a silo hopper having an upper hopper portion with flange means on opposite sides thereof supported on said support portions of the bracket means immediately below a silo chute when in working position, and movable on the support portions to a position below the silo chute and to a position to leave the discharge opening accessible;
    said hopper having a hopper opening and a generally circular periphery lower part;
    support ring means fastened to the lower part and having inwardly tapering lower edges; and
    a lower swivel member having a hopper outlet that faces at least partially laterally and having an upper swivel portion with tapered edges supported on the ring means for rotation relative to the upper hopper portion for permitting moving the outlet to a plurality of different angular positions with respect to an upright axis.

* * * * *